United States Patent
Bernstein et al.

(10) Patent No.: US 6,497,410 B1
(45) Date of Patent: Dec. 24, 2002

(54) TRADING CARDS FOR AN INVESTMENT GAME, AND GAME AND METHOD THEREOF

(75) Inventors: David T Bernstein, York, PA (US); Brian N King, York, PA (US); Dennis L. Betz, Jr., York, PA (US)

(73) Assignee: BetzBern Inc., York, PA (US)

( * ) Notice: Subject to any disclaimer, the term of this patent is extended or adjusted under 35 U.S.C. 154(b) by 0 days.

(21) Appl. No.: 09/911,852

(22) Filed: Jul. 25, 2001

(51) Int. Cl.[7] .................................................. A63F 1/02
(52) U.S. Cl. ........................ 273/297; 273/292; 273/293; 463/9
(58) Field of Search ................................ 273/297, 292, 273/293; 463/9

(56) References Cited

U.S. PATENT DOCUMENTS

| | | | | |
|---|---|---|---|---|
| 4,002,342 A | * | 1/1977 | Biggs | 273/239 |
| 4,363,489 A | | 12/1982 | Chodak et al. | |
| 4,431,195 A | | 2/1984 | Brand et al. | |
| 4,437,670 A | * | 3/1984 | Simon | 273/278 |
| 4,466,515 A | * | 8/1984 | D'Aurora et al. | 273/256 |
| 4,913,446 A | * | 4/1990 | Winkelman | 273/240 |
| 4,934,707 A | | 6/1990 | Koster | |
| 4,948,145 A | * | 8/1990 | Breslow | 273/142 R |
| 4,979,750 A | | 12/1990 | Endrody | |
| 5,009,429 A | * | 4/1991 | Auxier | 273/240 |
| 5,038,284 A | * | 8/1991 | Kramer | 340/825.26 |
| 5,297,031 A | * | 3/1994 | Gutterman et al. | 705/37 |
| 5,551,024 A | * | 8/1996 | Waters | 707/3 |
| 5,553,712 A | * | 9/1996 | Tisbo et al. | 206/449 |
| 5,579,117 A | * | 11/1996 | Arsenault et al. | 101/40 |
| 5,662,332 A | | 9/1997 | Garfield | |
| 5,826,878 A | * | 10/1998 | Kiyosaki et al. | 273/256 |
| 5,829,746 A | | 11/1998 | Pacella | |
| 5,829,747 A | * | 11/1998 | Nebel | 273/256 |
| 5,864,604 A | * | 1/1999 | Moen et al. | 379/114.05 |
| 5,934,674 A | | 8/1999 | Bukowsky | |
| 5,982,736 A | * | 11/1999 | Pierson | 369/273 |
| 6,032,957 A | * | 3/2000 | Kiyosaki et al. | 273/256 |
| 6,061,656 A | | 5/2000 | Pace | |
| 6,106,300 A | | 8/2000 | Kiyosaki et al. | |
| 6,129,631 A | * | 10/2000 | Hundal et al. | 273/292 |
| 6,322,076 B1 | * | 11/2001 | Fikki | 273/256 |
| 6,375,466 B1 | * | 4/2002 | Juranovic | 273/292 |

* cited by examiner

Primary Examiner—Benjamin H. Layno
Assistant Examiner—Dolores R. Collins
(74) Attorney, Agent, or Firm—Nixon Peabody LLP; Tim L. Brackett, Jr.; Todd A. Vaughn (57) ABSTRACT

A collectible trading card, investment game using a set of trading cards, and a method of playing the investment game designed to raise awareness in the concepts of investing in the equities market. Each trading card features a unique publicly traded corporate business entity and includes printed indicia including at least one of corporate, product, service and financial information of a corporate business entity associated with the card and represents at least one theoretical share of stock in a corporate business entity. The printed indicia allows a collector to engage in a trade of at least one card to another collector based on at least the actual stock price of the corporate business entity associated with the card.

34 Claims, 5 Drawing Sheets

TRADING CARDS FOR AN INVESTMENT GAME, AND GAME AND METHOD THEREOF

BACKGROUND OF THE INVENTION

1. Field of the Invention

The present invention is directed generally to collectible trading cards. In particular, the present invention is directed to collectible trading cards which feature information relating to a corporate business entity and an investment game using the collectible trading cards which is designed to raise awareness in the concepts of investing in the stock market.

2. Description of the Related Art

The history of trading cards began with the advent of professional sports in America during the nineteenth century. Tobacco manufacturers first produced trading cards and included them as a free accompaniment with a purchase of their products. These cards consisted of sections of a cardboard base having printed images of sports figures on one side and statistical information for that respective sport figure on an opposite side. It was not until the emergence of television during the Golden Age of sports, associated with the 1950's and athletes such as Willie Mays, Mickey Mantle, Johnny Unitas, and Bill Russell, did trading cards become a favorite hobby of Americans. Today, the trading of sports cards makes up a multi-billion dollar industry dominated not only by children, but avid, knowledgeable sports fans seeking wise investments. However, there are currently no trading cards on the market which are geared for educating novice investors on the stock market.

There have been numerous games associated with the trading of stocks. For example, U.S. Pat. No. 5,934,674 to Bukowsky discloses a stock market game including a display unit which provides players with information concerning the current value of stocks within the game and provides a running total of the value of the stock portfolios they have built. The current value of the stocks, however, is randomly generated by a processing unit, and thus, is not based upon actual stock market conditions. While the game uses an electronic display, it is a board game which is not capable of being played online. Also, the reference fails to disclose a collectible stock card for use in combination with the investment game.

U.S. Pat. No. 5,829,747 to Nebel discloses a stock market game for play by a one or more players which simulates for each player security transactions and includes stock certificates of seven companies represented on the game. The stock certificates, however, are of fictitious companies whose value is generated by the roll of a pair of dice.

U.S. Pat. No. 4,979,750 to Enrody discloses a trading card game including cards that are designed to represent commodities, industries or any property that can be traded in the real world. The game fails to specifically disclose, however, a collectible trading card system featuring publicly-traded corporations and including a graphic representation of notable products and/or images of the respective corporation and textual stock information pertaining to that corporation.

SUMMARY OF THE INVENTION

In view of the foregoing, it is an object of the invention to overcome the disadvantages in the related art.

It is another object of the present invention to provide a set of collectible trading card designed to raise the awareness of the principles of stock investing.

It is a further object of the present invention to provide an educational game based on a set of trading cards and which simulates actual investment scenarios which occur on an equities exchange.

It is yet another object of the invention to provide an online investment game for participation by both novice and skilled stock market investors.

These and other objects are achieved in accordance with an exemplary embodiment of the invention in providing a collectible trading card featuring information relating to a corporate business entity, such as a publicly traded corporation in an equities market. Preferably, the card comprises a relatively thin base material having a front surface and a back surface. The front surface of the stock card may include at least a picture of notable products or images of a selected corporate business entity, while the back surface is provided at least with indicia of financial and product information relevant to that corporation. The information provided may include publicly released corporate business entity data such as share price, annual revenues and earnings.

In addition, each stock card is provided with an issue date, the "issue date" being defined here as an arbitrary date assigned to each stock card to provide a point of reference in determining the theoretical value of the card and is preferably the date in which the card is issued, produced or offered for sale. Each card is also provided with a theoretical share value, or "issue price", which correlates directly with the actual value of the stock of the corporate business entity represented on the card on the issue date. Preferably, each stock card is provided with educational features that will assist the novice trading card collector in learning the basic fundamentals of investing, trading and asset management. However, an individual "educational card" may be provided to better educate the collector of the various terms and strategies that are involved in equity trading. Purchasers, collectors or collectors of a stock may engage in trading one or more of their respective cards with other collectors in order to build a complete set of cards based on their portfolio objectives or to obtain every card issued in a series of cards.

In accordance with another aspect of the invention, a set of stock cards are used to participate in an online investment game based on the collection and/or trade of one or more stock cards. The online game, unlike conventional board games, creates a game that simulates actual investment scenarios using stock cards which represent actual corporate business entities. An objective of the online trading game is for each participating player to build a portfolio of stock cards based on their respective portfolio goals. The player/collector trades, or collects, cards to meet their respective portfolio objectives.

For purposes of playing the online game, a single stock card represents one theoretical share of the respective corporate business entity depicted on the stock card. One advantage of the online game in accordance with the present invention is that the theoretical value of the card changes depending upon the actual or real-time value of one share of the corporate business entity indicated on the stock card. The actual or real-time value is defined here as the market price of one share of the respective corporate business entity's stock at the end of an equities trading day. Accordingly, fluctuations in the stock market will directly affect the theoretical value of a stock card, and thus, makes it desirable for the collector to hold the stock card in hopes that the value of the corporate business entity's stock increases over time.

Preferably, a new set of trading cards are produced at least once every calendar year, and will include updated public information from the selected corporate business entities. Each set of cards will include a card which lists every corporate business entity represented during that calendar year. Through trading, participating in the online activities and use of the educational cards, collectors will learn about various investment strategies and relevant financial information based on actual stock market conditions.

As previously mentioned, each card will have indicia indicating certain financial and product information such as the issue price and the number of shares each card represents. The collector of the stock card will have theoretical shares of stock that become more or less valuable depending upon the current actual market price obtained from the stock exchange where that stock trades. In addition, collectors of the stock cards may trade their cards with other collectors in an effort to build a portfolio of stock cards that meet their personal stock card portfolio objectives and risk tolerances. Accordingly, participants in the online game in accordance with the present invention learn fundamental investment skills and strategies using the trading cards to build an investment portfolio based on actual corporate business entities and actual stock market conditions.

DETAILED DESCRIPTION OF THE PREFERRED EMBODIMENTS

Figure 1:
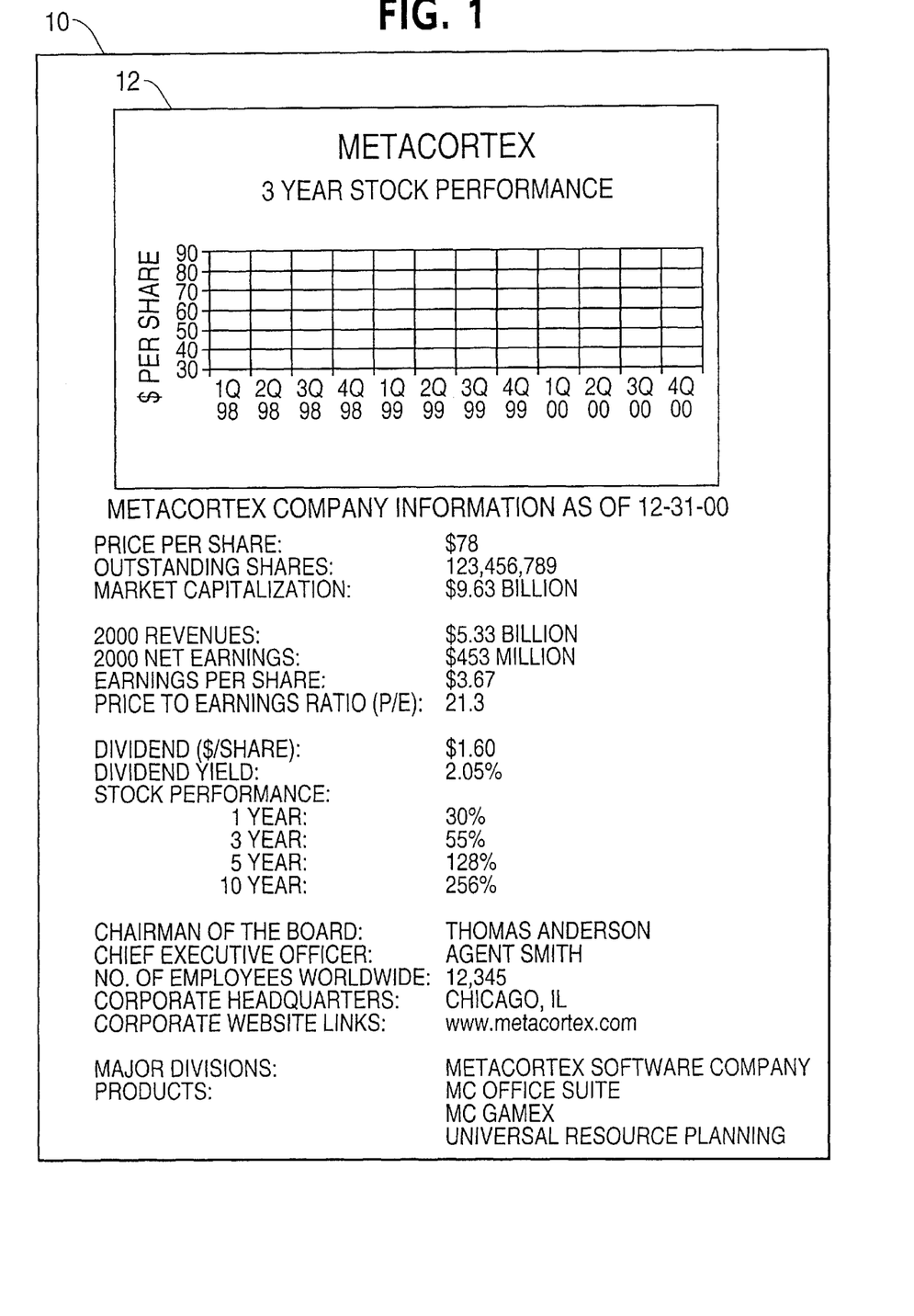
FIG. 1 is front view of a front side of the stock card in accordance with the present invention.
Figure 2:
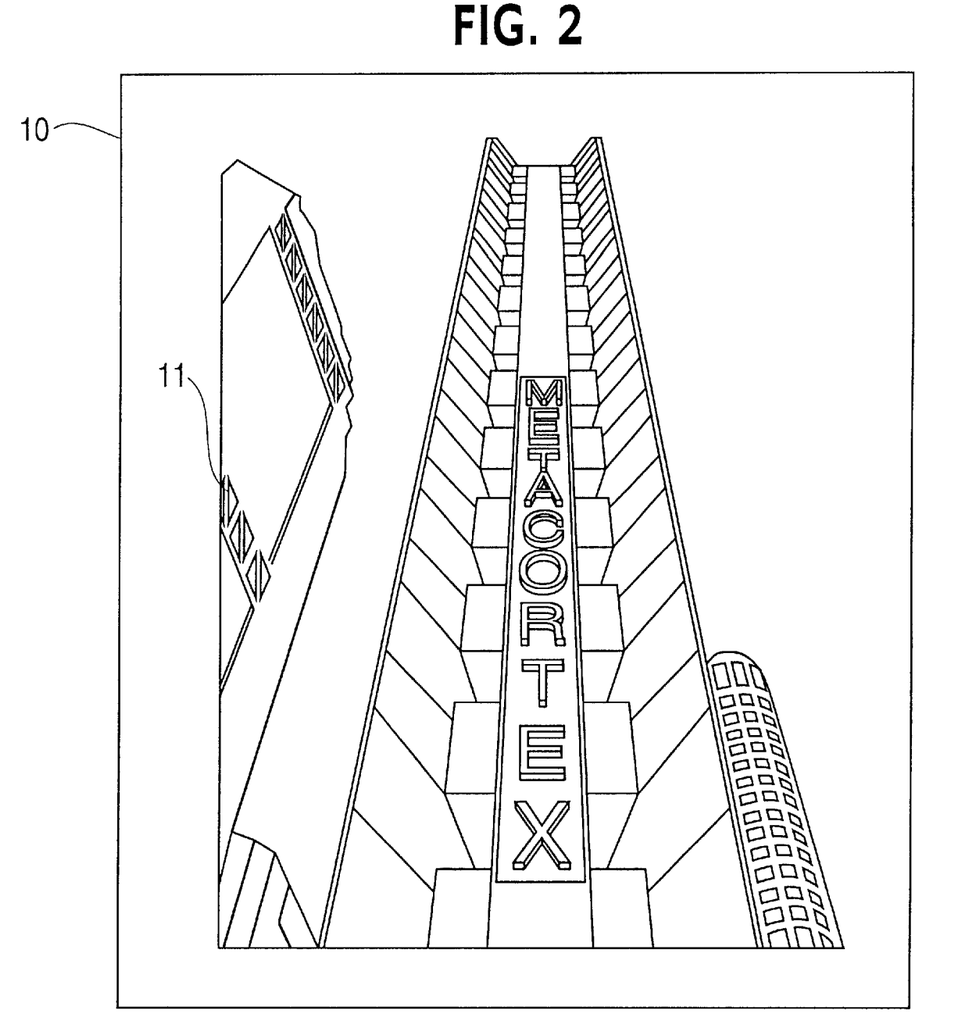
FIG. 2 is a front view of the rear side of the stock in accordance with the present invention.

As shown in FIGS. 1 and 2, in a preferred embodiment of the invention, a trading or stock card 10 comprises a thin rectangular substrate having a planar front surface 11 and a planar rear surface 12. Preferably, the substrate is composed of a 2.5 in×4.5 in (64 mm×89 mm) card stock or any other flexible material suitable for printing, such as paper, film or foil. The card 10, however, is not limited to the aforementioned size and may reasonably encompass any size. The stock card 10 may be provided with unique identifying features such as a holographic overlay, hot stamp and security fibers, threads, or printing.

Moreover, the stock card 10 may be composed of a laminate of at least one layer of paper, film, foil or coating, and may include a suitable adhesive, tape or binder to keep the layers intact. Other layers may be added, such as a holographic foil, to add distinction. To keep the stock card 10 in mint condition, the front and rear surfaces 11, 12 are preferably provided with a laminate coating which protects the stock card 10 against moisture and other environmental forces which destroy the integrity of the card 10.

In an exemplary embodiment of the present invention, the front surface 11 and/or rear surface 12 of the stock card 10 is printed with indicia of a photograph or image of a corporate business entity, such as a corporation which is traded on an equities exchange. Preferably, the front surface 11 is printed with a photograph or image of the official logo of the respective corporate business entity. However, the front surface 11 may be printed with a photograph or image of one or more symbols which are distinctive to the corporate business entity, such as a certain product, building, place, person, slogan or other art. In addition, the card 10 may be provided with a designation of the number of shares of stock of the corporate business entity the stock card 10 represents.

Preferably, the back surface 12 of the stock card 10 is provided with printed indicia including a price indicator representing a first theoretical value of at least one theoretical share of the respective corporate business entity represented by the card 10. The price indicator is advantageous since it allows a collector to compare the first theoretical value of the card 10 to an actual value of at least one actual share of stock in the corporate business entity in order to determine a second theoretical value of the theoretical share and to compare the second theoretical value to a third theoretical value associated with another card to determine a number of cards to be traded. Preferably, the price indicator is an issue price represented by a numerical value of one share of stock in the corporate business entity associated with each card 10 on the issue date of the card 10 which equals the actual price of an actual share of stock in the respective corporate business entity represented on the card 10.

As illustrated in FIG. 1, the card 10 is provided with printed indicia of financial and other information related to the corporate business entity. Such information may include, but is not limited to, stock prices, charts/graphs of stock prices, corporate business entity name, corporate headquarters location, corporate officers, products/services of the corporate business entity, stock symbol, corporate revenues, earnings, P/E ratio and earnings per share, dividend information, outstanding shares in corporation, market capitalization of corporate business entity, number of employees, manufacturing locations, corporate web site information, major divisions, and valuations ratios. This information will be the most recent as of the issue date of the stock card 10.

The card 10 may be printed on one or both sides using processes such as offset lithography, intaglio, rotogravure, xerographic, flexography, thermal transfer, direct thermal or ink jet. Latent security features or specialty inks may be added or used in the printing process to provide for unique product identification. UPC bar codes, alphanumeric codes, or a magnetic strip may be printed or applied onto one or both sides of each card to provide for a unique identification of each stock card 10, or a particular set of stock cards. The printed laminate card will be converted into individual or sets stock cards 10 through a die cutting or slitting process. Cutting or slitting operations may include providing the stock cards 10 with square, triangular, or rounded corners. Each stock card 10 is part of a series of cards 10 produced at least annually and which represents a plurality of various corporate business entities. Preferably, each card 10 may be provided with a unique identification number such as the date (e.g., year) printed thereon. This unique identification will provide the collector with a way of identifying the series from which a respective card 10 issued. In this way, the collector is capable of tracking the theoretical value of the card 10 as it goes through price variations, stock splits and stock dividends.

The present invention allows collectors of the stock cards 10 to engage in trading one or more cards 10 in an effort to build portfolios of cards which meet a portfolio objective.

The equities markets, which the trading of stock cards 10 simulates, are very complex. For beginner and novice investors, the present invention assists the collectors in learning about the financial markets. For advanced investors, the present invention provides a game that tests their theories and strategies for building and trading portfolios of stock cards 10 within their defined portfolio objectives. The stock card 10 provides collectors a way of learning more about the stock market. Accordingly, included in a series of cards 10 is an educational card that includes information on key financial terms and investment strategies.

A collector of the cards 10 may assess the theoretical value of the stock card 10 using indicia of financial information and product information printed on the cards 10. The collector, after review of various sources of information on the respective corporate business entity represented on the stock card 10, can better determine how that card 10 fits within the personal portfolio of cards being collected. Over time, as the actual price of the stock in the financial markets changes, the theoretical value of the corresponding card changes accordingly. Hence, the theoretical value of the stock card 10 deviates from the issue price, in the same manner that the actual stock price deviates from the share price at the time of the issue date of the card 10. As the theoretical value of the card 10 changes, the desirability of the collector keeping the card 10 will increase or decrease.

Each corporate business entity represented on each card 10 is grouped into different industry sectors. For example, each stock card 10 may have an industry sector that corresponds to the actual industry sector in which the corporate business entity participates. Collectors can, therefore, collect or trade cards 10 with a goal of collecting an entire industry sector. For instance, building a portfolio of industry sectors will assist collectors if they are attempting to collect each card 10 in the series of cards produced that calendar year. On the other hand, more sophisticated collectors can also collect certain industry sectors which they feel are undervalued. For example, if a collector feels that a certain industry sector in the stock market is undervalued, then the collector can trade a sector of the market which he feels is overvalued to another collector for the undervalued sector. Collecting an entire industry sector will help diversify the stock card portfolio of the collector.

Collectors of the card 10 will implement different types of strategies and risk scenarios in building their personal portfolio of cards, just as one would for an actual stock portfolio. The card 10 thus encourages collectors to develop a strategy for their stock card portfolio in an attempt to build a portfolio by increasing the value of the stock cards 10 in their respective portfolio. When trading one or more cards 10, the collector can determine the number and value of cards 10 based on the actual stock price of the companies they desire to trade.

The present invention permits collectors or traders of the stock card 10 to have different objectives for collecting and trading the cards 10. Of course, the main objective is to maximize the theoretical value of the stock card portfolio by collecting cards and/or trading the cards 10. Collectors may also attempt to obtain every card 10 issued in a series of cards. The collectors can either purchase cards, or two or more people can trade cards in an attempt to obtain their portfolio goal.

In order for a collector to become successful at building portfolios of the trading cards 10, one or more like collectors may come together and trade cards 10, either in-person or over an electronic medium such as the Internet. Trading the stock cards 10 allows collectors to be successful at implementing different financial strategies and risk tolerance levels of their respective stock card portfolios. The trading cards 10 may contain information on different financial markets, such as, but not limited to the currency market, equities market, debt market, futures market, and international markets.

Each series of stock cards 10 will include one or more educational cards (not shown) for instructing the collector on the fundamentals of investing and trading in the stock markets. The educational card includes indicia of printed information which serve as a reference guide to various investment terms and investment strategies that will make the collector better educated in terms of investing. The indicia of printed information on the educational card may include, but is not limited to, information on topics such as the U.S. Dollar, foreign currency, the U.S. Federal Reserve System, economic indicators, consumer confidence, the consumer price index, inflation, stocks, market indexes, corporate bonds, U.S. Treasury bonds notes and bills, municipal bonds, mutual funds, futures, options, commodities, social security, employer plans, IRA's, 401K plans, the Securities and Exchange Commission, publicly held corporations, stock exchanges, board of directors, corporate management, capital gains dividends, brokerage firms, capital investment, money supply, investment banking, market makers, intellectual property, net earnings, revenue, shares, market capitalization, price to earnings (P/E) ratio, international trade, marketing and advertising, American Depository Receipts, buy and hold, dollar cost averaging and indexing. Accordingly, collectors may use the educational card to become more knowledgeable about the fundamentals of stock investing.

Figure 3:
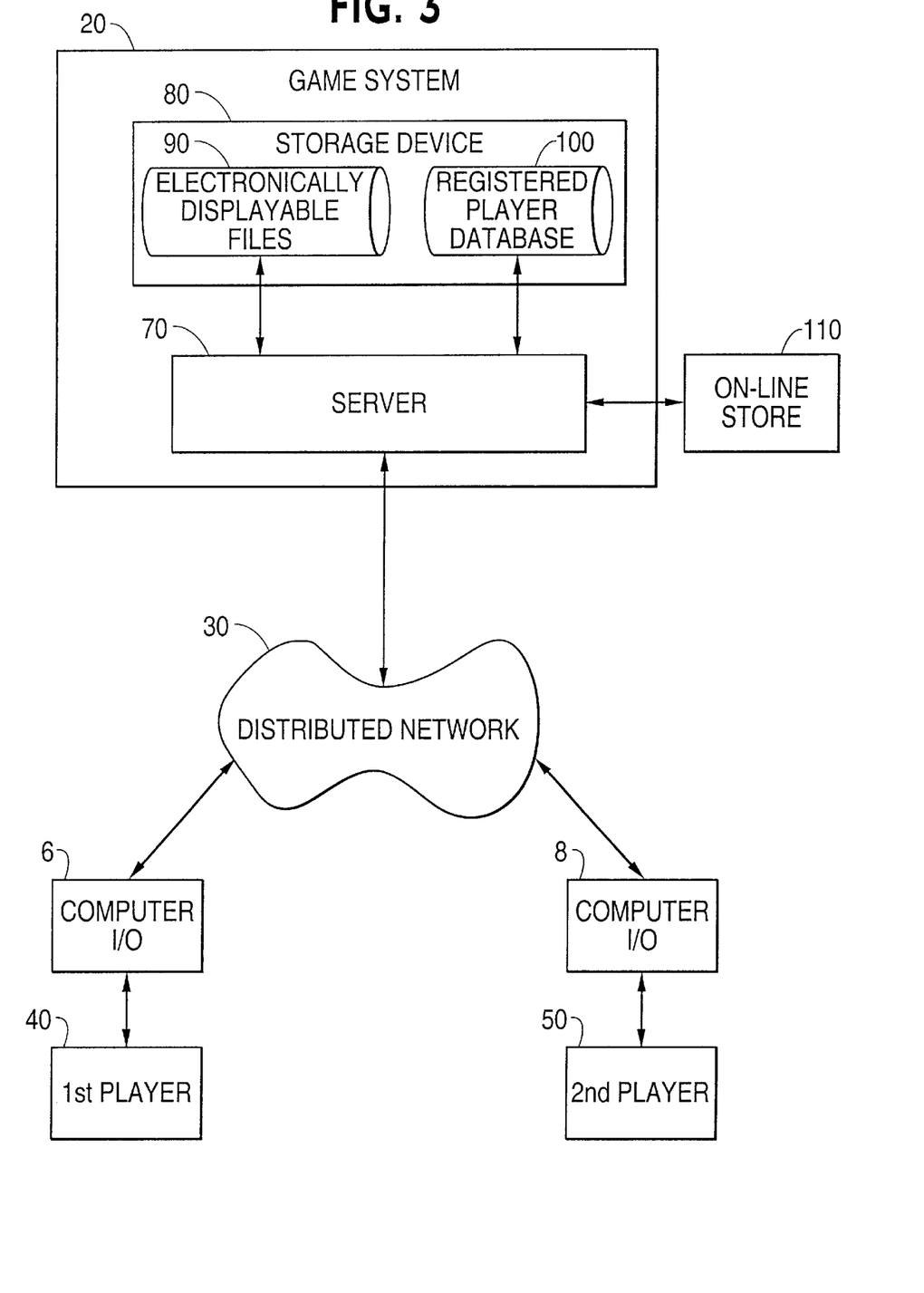
FIG. 3 is a schematic illustration of the game system in accordance with another embodiment of the present invention.

FIG. 3 illustrates an investment game in accordance with another embodiment of the present invention which permits the trading of one or more stock cards 10 by a plurality of game players. The game includes a set of the previously described trading cards 10, a game system 20 that is electronically linked to a distributed network 30 to guide one or more participants, such as a first player 40 and a second player 50, along a trading pathway that allows a plurality of players 40, 50 to build and maintain a portfolio of trading cards 10, and a processor device 60 for determining a recommended number of a first trading card to be traded for a second trading card. It should be understood that the term "trading pathway" generally refers to a series of time-sequenced steps or phases explained in further detail hereinbelow that facilitate successful participation in the game. Of course, additional players may also access and use the game system 20 in accordance with the present invention as well but are omitted to simplify the discussion herein.

The main object of the investment game is for a player 40, 50 to collect as many cards as possible and increase the overall value of their respective stock card portfolio. By engaging in the trade of one or more cards 10, each player 40, 50 attempts to add companies which he feels will rise in value, thereby increasing the value of the portfolio.

As can be seen in FIG. 3, players 40, 50 access the game system 20 through the distributed network 30 using a terminal device such as computers 6, 8 respectively which are in electronic communication with the distributed network 30. In this regard, each computer 6, 8 includes an input device (not shown) and a output device such as a display device (not shown). Input devices can be a mouse, a keyboard or the like, while the output device is preferably a display device such as a monitor or a liquid crystal display (LCD) screen. Of course, other input and output devices can also be used in accordance with the present invention. In this regard, players 40, 50 may access the game system 20 through the distributed network 30 using any type of computing device or data terminal such as a personal computer, a portable computer, a dumb terminal, a thin client, a hand-held device, a wireless telephone, or any combination of such devices.

It should also be appreciated by one of ordinary skill in the art that the distributed network 30 can be any type of a communications network such as the Internet, a local area network (LAN), a wide area network (WAN), a direct computer connection, or the like. The communication between the game system 20 and players 40, 50 may be established using any type of communication hardware and protocols which are already well known in the art. For instance, such communication can be accomplished over electric cable, fiberoptic cable, or any other cable, or in a wireless manner using radio frequency, infrared, or other technologies.

In the present illustrated embodiment of FIG. 3, the game system 20 includes a server 70 and a storage device 80 with databases and files described herein below for guiding the players 40, 50 along a trading pathway which allows each player a chance to build and maintain a portfolio of trading cards 10 by acquiring one or more cards through acquisition or trade with another player 40, 50. It should be initially noted that whereas a single server 70 is illustrated in the present embodiment, it should be appreciated that the server 70 can also be a multiplicity of computers at a single or multiple locations. For example, a server 70 may be comprised of plurality of redundant computers located in different locations to facilitate scalability. In this regard, part or all of the game system 20 may be provided in a single location. The details of accessing the information provided by the game system 20 is discussed in further detail below which illustrate a specific example of the game system 20 implemented over the Internet also known as the "world wide web".

Referring again to FIG. 3, the storage device 80 in accordance with the present invention is in electronic communication with the server 70 and is adapted to store therein electronically displayable files 90 which may be in a database or arranged in any appropriate manner which permits retrievable access to the files. The electronically displayable files 90 in accordance with the present invention contain actual information associated with each corporate business entity represented in the game, as well as information relating to a respective portfolio for each player 40, 50, the details of which are provided hereinbelow.

As can also be seen in FIG. 3, the storage device 80 further includes a registered player database 100 for storing information regarding each player 40, 50 accessing the game system 20. In this regard, the registered player database 100 stores player specific information such as player name, account number, and other types of information which are specific to each player 40, 50. Moreover, the server 70 may also be linked to an on-line store 110 that allows a player 40, 50 to purchase products and/or services associated with the trading cards 10 and/or game system 20. It should be noted that whereas in the present illustrated embodiment, the on-line store 110 is provided by a third party, in other embodiments, the on-line store 110 may be operated directly by the game system 20.

Figure 4:
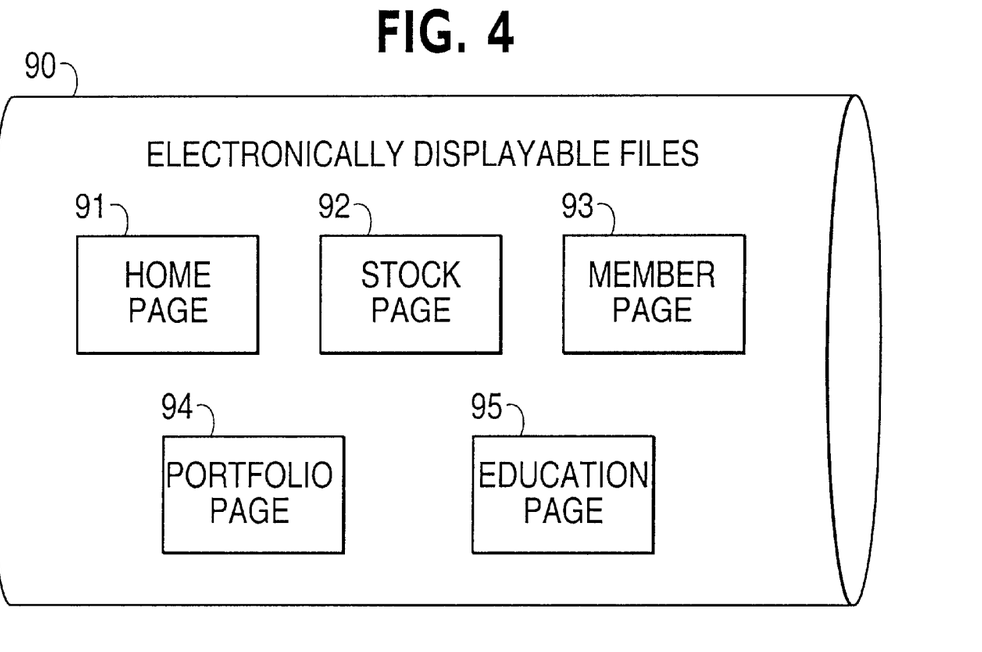
FIG. 4 is a schematic illustration of the electronically displayable files as shown in FIG. 3.

FIG. 4 illustrates the electronically displayable files 90 of FIG. 1 in further detail in accordance with one embodiment of the present invention. As can be seen, the electronically displayable files 90 includes a plurality of web pages displayable on the Internet including a main web page and at least four auxiliary web pages interfaced to the main web page via direct hypertext links. The auxiliary web pages comprises a home page 91, a stock page 92, a member page 93, a portfolio page 94, and an education page 95.

The home page 91 will be encountered initially at the web site and is an electronically displayable file that contains links to the various pages of the web site, or to other sites. The home page 91 may also contain the latest values and a list of each corporate business entity represented in the game and a set of rules for participating in the game. Further, the home page 91 includes direct hypertext links which allow a player 40, 50 to access the corporate web sites of each corporate business entity represented in the game.

The member page 93 is a personalized or customized page for each player 40, 50 registered to the web site. The member page 93 is an electronically displayable file that contains information which is tailored for each respective player 40, 50, such as an overall theoretical account value of each stock card 10, an overall list of each corporate business entity represented in the portfolio, and various stock indices which relate to each of the corporate business entities represented in a respective portfolio. Additionally, the member page 93 may also provide hypertext links to other areas of the web site, thereby permitting access into user instructions, research, news, chat room, and message boards.

As previously mentioned, the home page 91 contains an overall list of the corporate business entities represented on the cards 10, and further includes a direct hypertext link to an individual web page for each respective corporate business entity represented in the game. Hence, each player 40, 50 participating in the game may directly access an individual corporate business entity's stock card page in order to access publicly disclosed corporate, financial, product, and services information for each respective corporate business entity. Such financial information may include, but is not limited to, volume of shares traded, current price, and daily price change.

Figure 5:
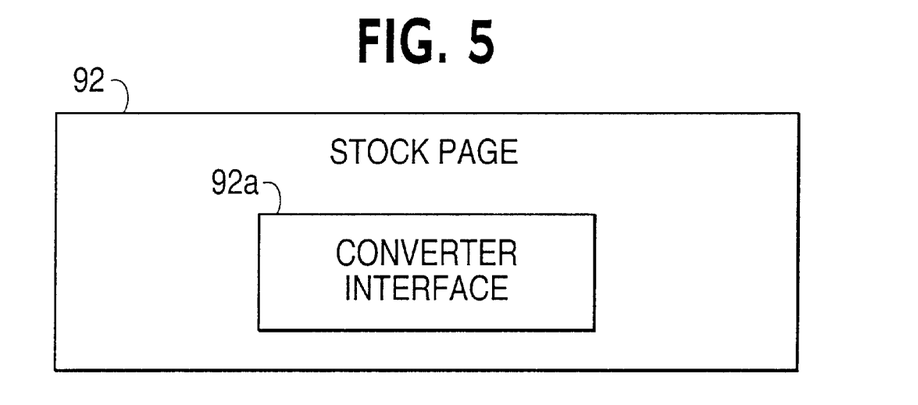
FIG. 5 is a schematic illustration of a stock web page as shown in FIG. 4.

As shown in FIG. 5, the stock page 92 is an electronically displayable file that contains an external web link to the web site of each corporate business entity represented in the game and will provide certain financial and profile information about a particular corporate business entity, such as up-to-date financial news concerning that particular corporate business entity. The stock page 92 is provided with a stock card converter interface 92a which lists a recommended number of cards that a stock card 10 may be traded for another stock card 10. The converter interface 92a includes one or more inputs that allows each player 40, 50 to enter the actual value of the card 10 and the number of shares associated with the card 10. The converter interface 92a calculates the conversion based on the actual prices of a respective corporate business entity involved in a potential trade of cards 10. For example, if Acme, Inc. is trading at $5/share and Matromix is trading for $15/share, and one Acme, Inc. card represents one share of stock and one Matromix card also represents one share, the converter 92a will recommend that three Acme, Inc. cards should be traded for each Matronix card. Of course, the converter interface 92a only recommends the number of cards that should be traded, and thus, each player 40, 50 in the game may choose to follow the recommendation or may choose to use their own personal judgment to make a trade.

The portfolio page 94 is an electronically displayable file that allows each player 40, 50 to maintain a record of their respective stock card portfolio. The portfolio page 94 includes at least one inputs that allows each player 40, 50 to enter the number of cards collected for a particular stock card 10, and thus, serves as an online inventory of stock cards 10. The portfolio page 94 will list the companies and the number of cards for each corporate business entity that the player 40, 50 has entered. The portfolio page 94 also includes at least a display of the overall portfolio and the overall portfolio value for each player 40, 50. The portfolio value changes daily depending on the number of stock cards 10 collected or traded, and on the actual stock price of a corporate business entity represented at the closing of an equity exchange on a particular day.

The education page 95 will include at least a glossary of investment terms and strategies that are similar to the topics covered on the educational cards. The educational page 95 gives each player 40, 50 of the game a better understanding of the terminology of investment concepts and products involved in the stock market. Moreover, various investment strategies will be highlighted in which the player 40, 50 may employ in the game to attempt to increase the value of their stock card portfolio.

Figure 6:
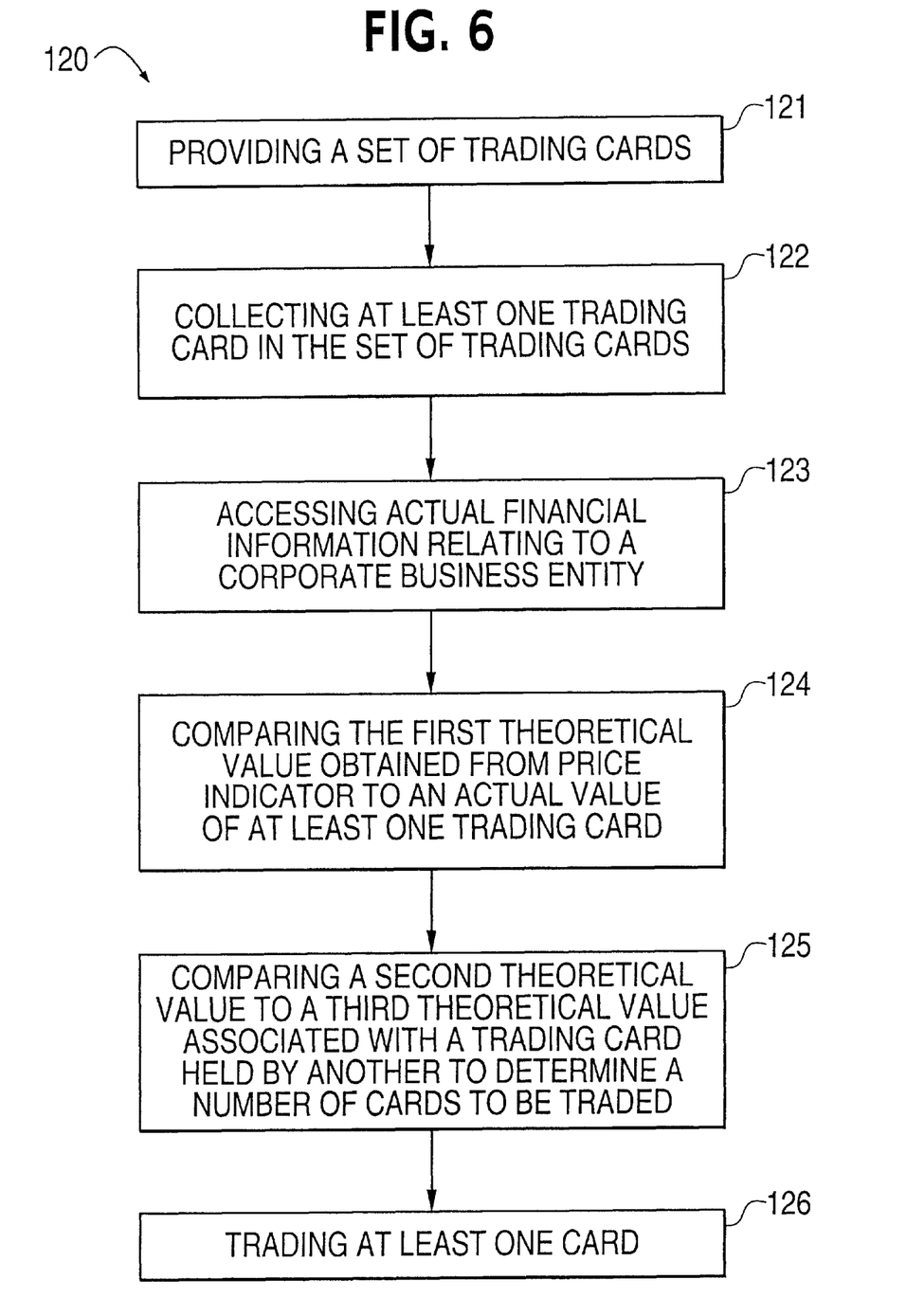
FIG. 6 is a flowchart illustrating a method for playing the trading game guiding in accordance with an embodiment of the present invention.

FIG. 6 illustrates a method 120 in accordance with an embodiment of the present invention for using the above-described game system 20 to guide a participant or player along a trading pathway associated with participating in the game. As can be seen in FIG. 5, the illustrated method 120 includes step 121 which involves providing a set of trading cards 10. As previously mentioned, each card 10 represents at least one theoretical share of stock in a corporate business entity and includes printed indicia of information relating to the corporate business entity. Again, the printed indicia includes a price indicator which represents a first theoretical value of at least one theoretical share of the corporate business entity. Note that the initial step may include registration as a player in the online game as discussed hereinabove.

Step 122 involves collecting at least one trading card 10 in the set of trading cards to create a portfolio of trading cards based on the objectives of the player 40, 50. Step 123 relates to accessing actual financial information relating to a respective corporate business entity represented by the printed indicia on a respective trading card 10. Step 124 requires comparing the first theoretical value obtained from the price indicator located on the card 10 to an actual value of at least one actual share to determine a second theoretical value for at least one trading card. As previously mentioned, the actual value of the actual share of stock is based on the market price of one share of the respective corporate business entity's stock at the end of an equity trading day. Hence, fluctuations in the stock market will directly effect the theoretical value of a respective stock card 10, thereby making it desirable to hold the stock card 10 in hopes that the actual value of the corporate business entity's stock increases over time. Of course, the actual stock price may be obtained from a variety of sources, such as but not limited to, printed publications and/or electronic publications.

Step 125 involves comparing the second theoretical value of the stock card 10 to a third theoretical value associated with another card held by another player 40, 50 in order to determine a number of cards to be traded. The final step 126 concerns trading at least one trading card based on the aforementioned accessing 123 and comparing 124, 125 steps.

Although exemplary embodiments of the present invention have been described in detail herein, it should be appreciated by those skilled in the art that many modifications are possible without materially departing from the spirit and scope of the teachings and advantages which are described herein. Accordingly, all such modifications are intended to be included within the spirit and scope of the present invention.

What is claimed is:

1. A set of collectible trading cards for use in an investment game to allow a card collector to develop a theoretical investment portfolio, said set of cards comprising:
   a plurality of trading cards, each of said plurality of trading cards including a base having a front side and a rear side opposite to said front side,
   wherein said base includes printed indicia on at least one of said front and said rear sides, each card in said set of trading cards representing at least one theoretical share of stock in a corporate business entity, said printed indicia including a price indicator representing a first theoretical value of said at least one theoretical share of the respective corporate business entity, said price indicator allowing the collector to compare said first theoretical value to an actual value of at least one actual share to determine a second theoretical value of said at least one theoretical share and to compare said second theoretical value to a third theoretical value associated with another card to determine a number of cards to be traded.

2. The trading card according to claim 1, wherein said corporate business entity is a publicly traded corporation on an equities exchange.

3. The trading card according to claim 1, wherein said price indicator is a price of one share of stock in said corporate business entity.

4. The trading cards according to claim 3, wherein said indicia further includes data of certain product or service information of said corporate business entity.

5. The trading card according to claim 4, wherein said indicia further includes a number of shares of stock each card represents.

6. The trading card according to claim 5, wherein said indicia further includes an issue date for each card.

7. The trading card according to claim 6, wherein said indicia further includes a graphic depiction of at least one of a logo or an image of the corporate business entity associated with a respective card.

8. The trading card according to claim 7, wherein said image is at least one of a product, person, slogan that is distinctive to said corporate business entity.

9. The trading card according to claim 7, wherein each card is laminated with a protective coating.

10. The trading card according to claim 9, wherein each card includes a distinctive holographic overlay.

11. The trading card according to claim 10, wherein said plurality of trading cards includes at least one education card, said at least one education card having indicia of information which instructs a collector on fundamentals of investing and trading in the equities markets.

12. An investment game for a plurality of players, each player attempting to procure a portfolio of stocks, said game comprising:
   a set of trading cards, each card in said set of trading cards representing at least one theoretical share of stock in a corporate business entity and including printed indicia of information relating to the respective corporate business entity;
   a game system including a storage device for retrievably storing a plurality of electronically displayable files containing information relating to the corporate business entity and the portfolio of each player;

a player terminal in electronic communication with said storage device and including an input device and a display device for displaying said electronically displayable files; and processing means for determining a recommended number of a first trading card to be traded for a second trading card for display by said display device.

13. The investment game according to claim 12, wherein said indicia includes a price indicator representing a first theoretical value of said at least one theoretical share of the respective corporate business entity, said price indicator allowing a player to compare said first theoretical value to an actual value of at least one actual share to determine a second theoretical value of said at least one theoretical share and to compare said second theoretical value to a third theoretical value associated with another card to determine a number of cards to be traded.

14. The investment game according to claim 13, wherein said price indicator is a price of one share of stock in the corporate business entity associated with each card.

15. The investment game according to claim 14, wherein said corporate business entity is a publicly traded corporation on an equities exchange.

16. The investment game according to claim 15, wherein said storage device comprises at least one Internet server.

17. The investment game according to claim 16, wherein said electronically displayable files comprise a plurality of Internet web pages.

18. The investment game according to claim 17, wherein said plurality of web pages includes a home web page and at least four auxiliary web pages interfaced to said home web page via direct hypertext links.

19. The investment game according to claim 18, wherein said home page includes at least a set of rules for playing the game.

20. The investment game according to claim 18, wherein said home page includes a direct hypertext link for allowing a player to access corporate web sites of each corporate business entity represented in the game.

21. The investment game according to claim 20, wherein said at least four auxiliary web pages comprises a member page, a stock page, a portfolio page and an education page.

22. The investment game according to claim 21, wherein said member page includes at least a display of the overall portfolio and the overall portfolio value for each player.

23. The investment game according to claim 21, wherein said stock page includes a direct hypertext link to an individual web page for each respective corporate business entity represented in the game.

24. The investment game according to claim 23, wherein said individual web page includes at least publicly disclosed corporate, financial, product, and services information for each respective corporate business entity.

25. The investment game according to claim 24, wherein said actual financial information includes at least one of a current stock price, volume of shares traded, daily high, daily low and daily price change of the stock.

26. The investment game according to claim 23, wherein said processing means is accessed from said stock page.

27. The investment game according to claim 26, wherein said processing means calculates a recommended number of cards to be traded for another card based on a current stock value of each card in a potential trade transaction and a number of shares associated with each card in the potential trade transaction.

28. The investment game according to claim 21, wherein said portfolio page includes means for calculating the current value of a stock portfolio for each player.

29. The investment game according to claim 28, wherein said means for calculating calculates the current value of a stock portfolio based on a current stock value of each card in the stock portfolio and a number of shares associated with each card in the stock portfolio.

30. The investment game according to claim 21, wherein said education page includes a list of a plurality of investment terms and concepts to assist each player in building and maintaining his respective stock portfolio.

31. A method of playing an investment game using trading cards, comprising the steps of:

providing a set of trading cards, each card in said set of trading cards representing at least one theoretical share of stock in a corporate business entity and including printed indicia of information relating to the corporate business entity, the printed indicia including a price indicator representing a first theoretical value of said at least one theoretical share of the corporate business entity;

collecting at least one trading card in said set of trading cards to create a portfolio of trading cards;

accessing actual financial information relating to any corporate business entity represented by said printed indicia on said at least one trading card;

comparing said first theoretical value to an actual value of at least one actual share to determine a second theoretical value for at least one trading card;

comparing said second theoretical value to a third theoretical value associated with another card to determine a number of cards to be traded;

trading said at least one trading card based on said accessing step and said comparing steps.

32. The method according to claim 31, wherein said price indicator is a price of one share of stock in the corporate business entity associated with each card.

33. The method according to claim 32, wherein said corporate business entity is a publicly traded corporation on an equities exchange.

34. The method according to claim 33, wherein said indicia further includes a number of shares of stock each card represents.

* * * * *